(12) United States Patent
Tanaka et al.

(10) Patent No.: US 12,038,601 B2
(45) Date of Patent: Jul. 16, 2024

(54) WAVELENGTH CHECKER

(71) Applicant: Nippon Telegraph and Telephone Corporation, Tokyo (JP)

(72) Inventors: Takuya Tanaka, Tokyo (JP); Kota Shikama, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 164 days.

(21) Appl. No.: 17/775,542

(22) PCT Filed: Nov. 13, 2019

(86) PCT No.: PCT/JP2019/044533
§ 371 (c)(1),
(2) Date: May 9, 2022

(87) PCT Pub. No.: WO2021/095165
PCT Pub. Date: May 20, 2021

(65) Prior Publication Data
US 2022/0381982 A1 Dec. 1, 2022

(51) Int. Cl.
G02B 6/42 (2006.01)
G02B 6/12 (2006.01)
G02B 6/13 (2006.01)

(52) U.S. Cl.
CPC ...... *G02B 6/12016* (2013.01); *G02B 6/12011* (2013.01); *G02B 6/13* (2013.01); *G02B 6/4245* (2013.01); *G02B 6/4292* (2013.01)

(58) Field of Classification Search
CPC ............................ G02B 6/4292; G02B 6/4245
See application file for complete search history.

(56) References Cited

U.S. PATENT DOCUMENTS

| | | | |
|---|---|---|---|
| 2003/0012494 A1* | 1/2003 | Bradshaw | G02B 6/30 385/31 |
| 2016/0315710 A1* | 10/2016 | Yeh | H04B 10/503 |
| 2022/0252570 A1* | 8/2022 | Di Giacomo | G01N 33/1846 |

OTHER PUBLICATIONS

Junichi et al., "Standardization Trends for Faster PON Systems", The Forefront of the Global Standard, NTT Technical Journal, vol. 29, No. 8, 2017, pp. 51-53.

* cited by examiner

Primary Examiner — Eric Wong
(74) *Attorney, Agent, or Firm* — SLATER MATSIL, LLP

(57) ABSTRACT

A light conversion portion is constituted by a conversion material that converts infrared light to visible light. A reflection portion is fixed to a position on a main substrate at which the reflection portion faces an output end of an optical waveguide chip on the side from which light is output to an external space. The reflection portion includes a reflection surface that faces the output end and is inclined with respect to a plane of the main substrate such that a reflection direction is toward the upper side of the main substrate. The reflection surface reflects near infrared light.

12 Claims, 11 Drawing Sheets

WAVELENGTH CHECKER

CROSS-REFERENCE TO RELATED APPLICATIONS

This application is a national phase entry of PCT Application No. PCT/JP2019/044533, filed on Nov. 13, 2019, which application is hereby incorporated herein by reference.

TECHNICAL FIELD

The present invention relates to a wavelength checker, more specifically to a wavelength checker for checking signal light in inspection for starting a PON system or isolating a failure in the PON system, for example.

BACKGROUND

In an access-type PON (Passive Optical Network) system of optical communication systems, a plurality of lights having relatively far wavelengths, such as 1.3 μm and 1.5 to 1.6 μm, may be used at the same time.

According to NPL 1, in a GE-PON (G-PON) system that has already been introduced, a wavelength of 1260 nm to 1360 nm (only a Regular band is described for the G-PON) is used for a signal (upstream signal) from a user to a station building. Also, in the G-PON system, a wavelength of 1480 nm to 1500 nm is used for a signal (downstream signal) from the station building to the user, and a wavelength of 1550 nm to 1560 nm is used for a downstream video signal.

In a 10G-EPON (XG-PON) system that is to be introduced in the future as well, a wavelength of 1.3 μm and a wavelength of 1.5 to 1.6 μm will be used. In a NG-PON2 system for which standardization has recently been complete, a wavelength of 1524 nm to 1544 nm (Wide band) is used for an upstream signal, a wavelength of 1596 nm to 1603 nm is used for a downstream signal, and a wavelength of 1550 nm to 1560 nm is used for a downstream video signal. Note that a description of PtPWDM (Point To Point Wavelength Division Multiplex) overlay, which is optional, is omitted. In this system, wavelength-division multiplexing is performed, unlike the GE-PON (G-PON) and the 10G-EPON (XG-PON). Wavelength arrangement of these systems is shown in FIG. 19.

Incidentally, in a PON system such as the GE-PON, optical power is checked in a test for starting the system. When the system shifts from the GE-PON to the 10G-EPON in the future, a larger number of various wavelengths will be used. When a test is performed under such circumstances, if it is possible to check the wavelength, it is possible to determine the type of a signal and easily isolate a failure, and work efficiency may be increased.

CITATION LIST

Non Patent Literature

[NPL 1] Ryo Koma, et al., "Standardization trends regarding further speed up of PON system", NTT technical journal, August 2017, pp. 51-53.

SUMMARY

Technical Problem

Incidentally, an optical spectrum analyzer is a means for measuring the wavelength. However, the optical spectrum analyzer includes a movable portion for detecting, with a detector, diffracted light obtained by moving a diffraction grating, and therefore, the devise is large and heavy, and is difficult to carry. There is also a disadvantage in that a power source of 100 V is commonly necessary. As described above, conventionally, there is a problem in that it is not easy to check, for example, whether or not signal light is coming, in inspection for starting a PON system or isolating a failure in the PON system.

Embodiments of the present invention were made to solve the problem described above, and has an object of making it possible to easily check the presence or absence of signal light when starting a PON system or isolating a failure in the PON system, for example.

Means for Solving the Problem

A wavelength checker according to embodiments of the present invention is a wavelength checker including: an optical waveguide chip; and a light conversion portion constituted by a conversion material that converts near infrared light to visible light, wherein the optical waveguide chip that is connected to an optical fiber includes an arrayed waveguide diffraction grating and is mounted on a main substrate, a reflection portion is fixed to a position on the main substrate at which the reflection portion faces a light emission end surface of the optical waveguide chip on the side from which light is output to an external space, the reflection portion includes a reflection surface that faces the light emission end surface and is inclined with respect to a plane of the main substrate such that a reflection direction is toward the upper side of the main substrate, and the light conversion portion is arranged on an optical path of reflected light that is emitted from the light emission end surface and reflects off the reflection surface, on the upper side of the reflection surface.

Effects of Embodiments of the Invention

As described above, according to embodiments of the present invention, the light conversion portion constituted by the conversion material that converts infrared light to visible light is arranged on the optical path of reflected light that is emitted from the light emission end surface of the optical waveguide chip on the side from which light is output to the external space and that reflects off the reflection surface of the reflection portion provided at a position on the main substrate at which the reflection portion faces the light emission end surface, on the upper side of the reflection surface, and therefore, it is possible to easily check the presence or absence of signal light when starting a PON system or isolating a failure in the PON system, for example.

BRIEF DESCRIPTION OF THE DRAWINGS

FIG. 12 is a characteristic diagram showing a calculation result of a transmission spectrum of an arrayed waveguide diffraction grating in a child optical waveguide chip 121a.

DETAILED DESCRIPTION OF ILLUSTRATIVE EMBODIMENTS

The following describes wavelength checkers according to embodiments of the present invention.

Embodiment 1

First, a wavelength checker according to Embodiment 1 of the present invention will be described with reference to FIGS. 1 and 2A to 2D.

Figure 1:
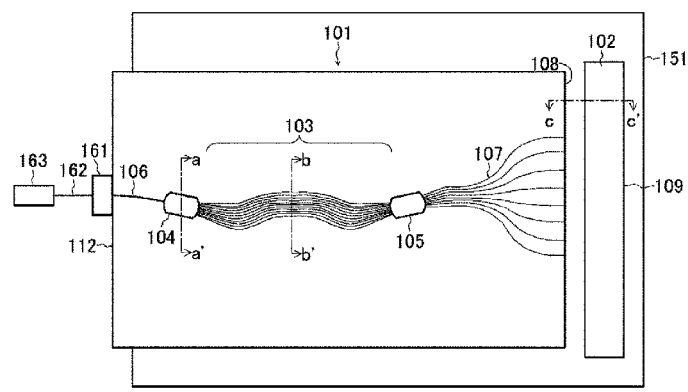
FIG. 1 is a plan view showing a configuration of a wavelength checker according to Embodiment 1 of the present invention.

The wavelength checker includes an optical waveguide chip 101. A known arrayed waveguide diffraction grating is formed in the optical waveguide chip 101 (see Reference Document 1). The arrayed waveguide diffraction grating includes a first arrayed waveguide 103, a first input-side slab waveguide 104, a first output-side slab waveguide 105, a first input waveguide 106, and first output waveguides 107. FIG. 1 shows a plane of the wavelength checker. Note that the reference sign 151 denotes a main substrate, the reference sign 109 denotes a reflection portion, and the reference sign 102 denotes a light conversion portion that is constituted by a conversion material that converts near infrared light to visible light. Also, the reference sign 161 denotes a fiber block, the reference sign 162 denotes an optical fiber, and the reference sign 163 denotes a connector.

The first arrayed waveguide 103 is constituted by a plurality of waveguides that have a constant difference in optical path length. The difference between optical path lengths of adjacent two waveguides of the first arrayed waveguide 103 is constant. The first input-side slab waveguide 104 is connected to a light input end of the first arrayed waveguide 103. The first output-side slab waveguide 105 is connected to a light output end of the first arrayed waveguide 103. The first input waveguide 106 is connected to an input side of the first input-side slab waveguide 104. A plurality of first output waveguides 107 are provided and are connected to an output side of the first output-side slab waveguide 105.

The light conversion portion 102 is constituted by a conversion material that converts infrared light to visible light. The reflection portion 109 is fixed to a position on the main substrate 151 at which the reflection portion 109 faces an output end (light emission end surface) 108 of the optical waveguide chip 101 on the side from which light is output to the external space. Also, the reflection portion 109 includes a reflection surface 109a that faces the output end 108 and is inclined with respect to a plane of the main substrate 151 such that a reflection direction is toward the upper side of the main substrate 151 (FIG. 2C). The reflection surface 109a reflects near infrared light. The reflection surface may also be constituted by a reflection film 109b that is formed by applying a coating material that reflects near infrared light, for example (FIG. 2D). In the case where the reflection film 109b is formed, a surface of the reflection film 109b that faces the output end 108 can be said to be the reflection surface.

The light conversion portion 102 is arranged on an optical path of reflected light that is emitted from the output end 108 and reflects off the reflection surface 109a, on the upper side of the reflection surface 109a (reflection film 109b). More specifically, the light conversion portion 102 is not arranged on an optical path along which light emitted from the output end 108 travels until reaching the reflection surface 109a, but is arranged on the optical path of reflected light. Note that the light conversion portion 102 is formed so as to extend in a direction in which the plurality of first output waveguides 107 are arranged. The light conversion portion 102 extends from one end to the other end of an array of the plurality of first output waveguides 107, for example.

The conversion material is a phosphor or a fluorescent substance that converts near infrared light to visible light, for example. The light conversion portion 102 can be obtained by mixing the conversion material with thermosetting silicone resin, and curing the resin through heating, for example. For example, a phosphor manufactured by Lumitek International can be used. An example of the conversion material has sensitivity in a range of 700 nm to 1700 nm.

In the wavelength checker according to Embodiment 1, near infrared light that is demultiplexed according to wavelengths by the arrayed waveguide diffraction grating, guided through the first output waveguides 107, and emitted from the output end 108 first reflects off the reflection surface 109a (reflection film 109b) of the reflection portion 109 and changes the direction of its optical path toward the upper side of the main substrate 151. The near infrared light (reflected light) that changed the optical path as described above reaches the light conversion portion 102, and visible light is generated. The generated visible light is emitted toward the upper side of the main substrate 151, and accordingly, can be seen on the upper side of the main substrate 151. Also, the visible light is generated from a position that the emitted near infrared light reached, and therefore, it is possible to identify a first output waveguide 107 from which the near infrared light is emitted, based on the position at which the visible light is generated. Since wavelengths of near infrared lights that are demultiplexed and guided through the respective first output waveguides 107 are already known, it is possible to check the wavelength by checking the position at which the visible light is generated (seen).

Figure 2A:
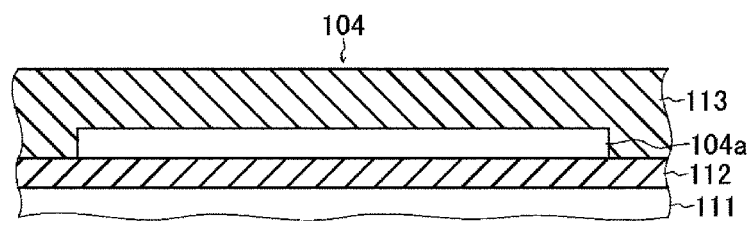
FIG. 2A is a cross-sectional view showing a configuration of a portion of the wavelength checker according to Embodiment 1 of the present invention.

Note that as shown in FIG. 2A, the first input-side slab waveguide 104 is constituted by a lower clad layer 112 that is formed on, for example, an Si substrate 111 constituted by Si, a core portion 104a that is formed on the lower clad layer 112, and an upper clad layer 113 that is formed on the core portion 104a. Note that FIG. 2A shows a cross section taken along a line aa' in FIG. 1. Also, the main substrate 151 under the Si substrate 111 is omitted in FIG. 2A.

Figure 2B:
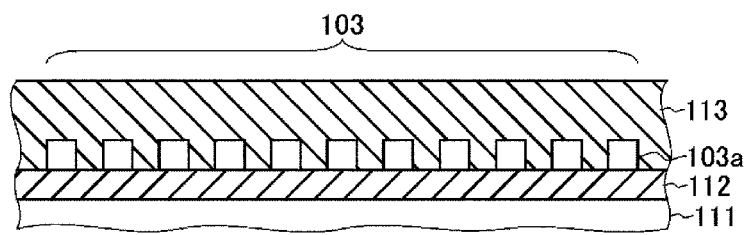
FIG. 2B is a cross-sectional view showing a configuration of a portion of the wavelength checker according to Embodiment 1 of the present invention.
Figure 2C:
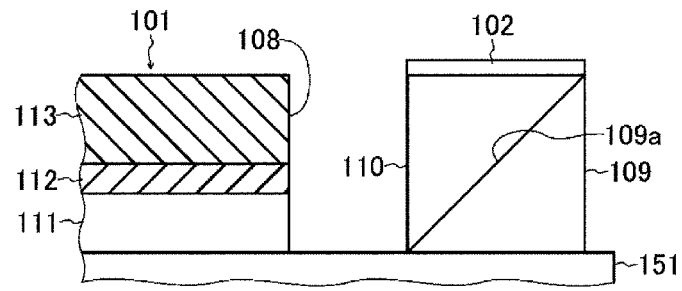
FIG. 2C is a cross-sectional view showing a configuration of a portion of the wavelength checker according to Embodiment 1 of the present invention.
Figure 2D:
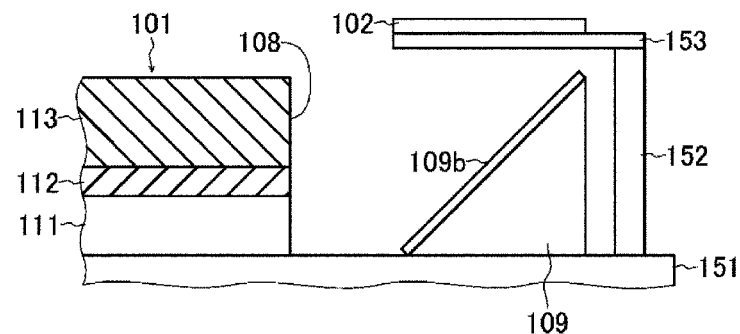
FIG. 2D is a cross-sectional view showing another configuration of a portion of the wavelength checker according to Embodiment 1 of the present invention.

Also, as shown in FIG. 2B, the first arrayed waveguide 103 is constituted by the lower clad layer 112 formed on the Si substrate 111, a plurality of core portions 103a that are formed on the lower clad layer 112, and the upper clad layer 113 formed on the plurality of core portions 103a. Note that FIG. 2B shows a cross section taken along a line bb' in FIG. 1. For example, the Si substrate 111 is a silicon substrate, each clad layer is constituted by quartz-based glass, and the core portions 103a and the core portion 104a are constituted by quartz-based glass. Note that the main substrate 151 under the Si substrate 111 is omitted in FIG. 2B.

Here, as shown in FIG. 2C, a right-angle prism 110 may be provided on the reflection portion 109. The right-angle prism 110 includes a light incident surface that faces the output end 108, a light emission surface that is orthogonal to the light incident surface, and a sloped surface that is adjacent to the light incident surface and the light emission surface. The sloped surface of the right-angle prism 110 faces the reflection surface 109a. The light conversion portion 102 is formed on the light emission surface of the right-angle prism 110. FIG. 2C shows a cross section taken along a line cc' in FIG. 1.

Alternatively, as shown in FIG. 2D, a configuration is also possible in which a transparent plate 153 that is supported by a support portion 152 and is arranged above the reflection surface 109a is provided above the main substrate 151, and the light conversion portion 102 is formed on a plate surface of the transparent plate 153. The transparent plate 153 is arranged on an optical path of reflected light that is emitted from the output end 108 and reflects off the reflection film 109b (reflection surface 109a). Also, the transparent plate 153 is constituted by a material that transmits near infrared light. Note that in a case where the light conversion portion 102 is formed on a plate surface of the transparent plate 153 that faces the main substrate 151, the transparent plate 153 can be constituted by a material that transmits visible light.

The following more specifically describes the arrayed waveguide diffraction grating. The following describes, as an example, a case where the first arrayed waveguide 103 is constituted by eight waveguides, and there are eight first output waveguides 107. Although FIG. 1 shows eleven waveguides, actually, the number of waveguides is greater than eleven. In this arrayed waveguide diffraction grating, multiplexed light with eight wavelengths, which is input to the first input waveguide 106, diverges into eight outputs.

First, the multiplexed light that is input to the first input waveguide 106 diffracts and spreads in the first input-side slab waveguide 104, and portions of the light respectively couple with the waveguides of the first arrayed waveguide 103 and are guided therethrough. The optical path length of the first arrayed waveguide 103 is long on the upper side of the sheet of FIG. 1 (outer side), and decreases toward the lower side of the sheet of FIG. 1 (inner side) by equal lengths. At the terminal end of the first arrayed waveguide 103, phase differences are generated between the waveguides of the first arrayed waveguide 103 from the outer side waveguide to the inner side waveguide. Therefore, when the light enters the first output-side slab waveguide 105, inclination of a fan-shaped equiphase surface generated due to the shape of the slab waveguide varies depending on the wavelengths, and the portions of light are collected to (optically couple with) corresponding first output waveguides 107 according to the wavelengths. Thus, wavelength-division-multiplexed light can be separated (demultiplexed) according to the wavelengths by the arrayed waveguide diffraction grating.

Figure 3:
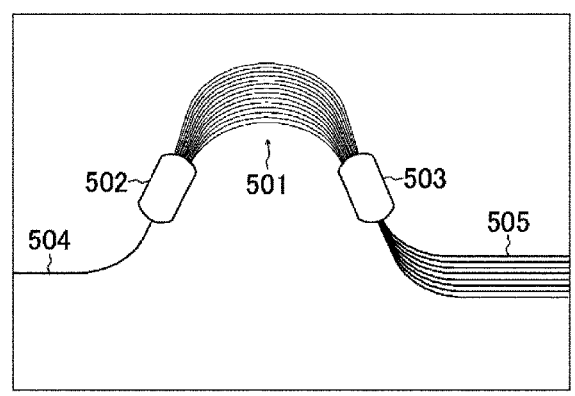
FIG. 3 is a plan view showing a configuration of an arrayed waveguide diffraction grating.

Note that, as shown in FIG. 3, in a commonly used arrayed waveguide diffraction grating, an arrayed waveguide 501 is curved at a single point like an arc in a plan view. In FIG. 3, the reference sign 502 denotes an input-side slab waveguide, the reference sign 503 denotes an output-side slab waveguide, the reference sign 504 denotes an input waveguide, and the reference sign 505 denotes output waveguides. In contrast, in the arrayed waveguide diffraction grating according to the embodiment, the first arrayed waveguide 103 is curved at a plurality of points in a plan view and has a shape like wings of a gull in a plan view. This will be described later.

The following describes details of optical path lengths of the waveguides constituting the first arrayed waveguide 103 of the arrayed waveguide diffraction grating according to the embodiment. When a difference between optical path lengths of adjacent waveguides of the first arrayed waveguide 103 is represented by ΔL, a center wavelength $\lambda_o$ of the arrayed waveguide diffraction grating is expressed by the following expression (1). The center wavelength $\lambda_o$ is usually the transmission center wavelength of the center port among output ports of the arrayed waveguide diffraction grating. In expression (1), $n_c$ represents an effective refractive index of the arrayed waveguide and m represents a diffraction order.

In this example, as counted from the upper side of the sheet of FIG. 1, an output end of the uppermost first output waveguide 107 will be referred to as a port 1, an output end of the second first output waveguide 107 will be referred to as a port 2, an output end of the third first output waveguide 107 will be referred to as a port 3, an output end of the fourth first output waveguide 107 will be referred to as a port 4, an output end of the fifth first output waveguide 107 will be referred to as a port 5, an output end of the sixth first output waveguide 107 will be referred to as a port 6, an output end of the seventh first output waveguide 107 will be referred to as a port 7, and an output end of the eighth first output waveguide 107 will be referred to as a port 8.

Math 1

$$\lambda_0 = \frac{n_c \Delta L}{m} \quad (1)$$

Also, the free spectral range (FSR) of the arrayed waveguide diffraction grating is expressed by the following expression (2).

Math 2

$$FSR \cong \frac{\lambda_0}{m} \quad (2)$$

As for expressions (1) and (2), refer to Reference Documents 2 and 3.

It is possible to cover all the wavelength regions of the above-described access-type PON systems by setting the free spectral range (FSR) of the arrayed waveguide diffraction grating to at least 400 nm of from 1250 nm to 1650 nm, setting the center wavelength $\lambda_o$ to 1450 nm, setting wavelength intervals to 50 nm, and setting the number of first output waveguides 107 to eight, for example. In this case, the center wavelength of the FSR is 1450 nm, and accordingly, the diffraction order m can be set to any of 1 to 3 according to expression (2).

Here, according to expression (1), the optical path length difference ΔL is a very small length on the order of μm, and cannot be realized with an arcuate structure in which the first arrayed waveguide 103 is curved only at a single point. Therefore, in the embodiment, the first arrayed waveguide 103 is curved at a plurality of points in a center portion and in portions (both side portions) on both sides of the center portion in a plan view. By providing a plurality of curved portions as described above, it is possible to make the optical path length change from the upper side (outer side) toward the lower side (inner side) of the sheet of FIG. 1 inversely at different curved portions of the first arrayed waveguide 103.

For example, the first arrayed waveguide 103 is curved outward at the center portion in a plan view, and is curved inward at the both side portions of the center portion in the plan view. In this configuration, the optical path length increases toward the outer side (upper side of the sheet of FIG. 1) in the center portion of the first arrayed waveguide 103, but decreases toward the outer side in the both side portions. It is possible to set a very small difference in optical path length in the entire first arrayed waveguide 103 by setting different values for a difference in optical path length between adjacent waveguides in the center portion of the first arrayed waveguide 103 and a difference in optical path length between adjacent waveguides in the both side portions to counterbalance changes in the optical path length in the center portion and the both side portions to some extent. Details of design of the above-described difference in optical path length are described in Reference Document 1.

Figure 4:
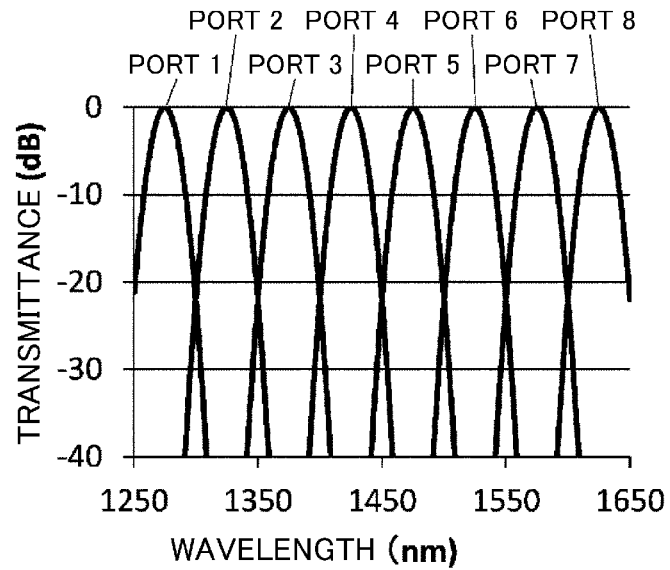
FIG. 4 is a characteristic diagram showing a calculation result of a transmission spectrum of an arrayed waveguide diffraction grating in an optical waveguide chip 101.

A function of the transmission spectrum of the arrayed waveguide diffraction grating (optical waveguide chip 101) is expressed by a Gaussian function. FIG. 4 shows a calculation result example. The transmission center wavelength of the output port 1 is 1275 nm. The transmission center wavelength of the output port 2 is 1325 nm. The transmission center wavelength of the output port 3 is 1375 nm. The transmission center wavelength of the output port 4 is 1425 nm. The transmission center wavelength of the output port 5 is 1475 nm. The transmission center wavelength of the output port 6 is 1525 nm. The transmission center wavelength of the output port 7 is 1575 nm. The transmission center wavelength of the output port 8 is 1625 nm.

The function of the transmission spectrum will be described. When loss is ignored, a transmission function of the arrayed waveguide diffraction grating can be expressed by expression (3) (see Reference Document 3).

Math 3

$$T(\delta f) = \exp\left\{-\left(\frac{\Delta x \delta f}{\omega_0 \Delta f}\right)^2\right\} \quad (3)$$

In expression (3), δf represents a deviation from a transmission center frequency, Δx represents an interval between center positions of the first output waveguides 107 connected to the first output-side slab waveguide 105, Δf represents an interval between center frequencies of adjacent channels, and $\omega_o$ represents a spot size.

Here, when a deviation from the transmission center wavelength is represented by δλ and an interval between center wavelengths of adjacent channels is represented by $\Delta\lambda$, the following expression (4) holds true, and expression (5) is obtained by substituting expression (4) into expression (3). Expression (3) that is expressed in the frequency domain is expressed in the wavelength domain by expression (5).

Math 4

$$\frac{\delta\lambda}{\Delta\lambda} = \frac{\delta f}{\Delta f} \quad (4)$$

$$T(\delta\lambda) \cong \exp\left\{-\left(\frac{\Delta x \delta\lambda}{\omega_0 \Delta\lambda}\right)^2\right\} \quad (5)$$

FIG. 4 shows a result of calculating the transmission spectrum of each channel of the arrayed waveguide diffraction grating using expression (5). Note that a parameter $\Delta x/\omega_o$ that represents steepness of the Gaussian function can be adjusted when the arrayed waveguide diffraction grating is designed, and the parameter $\Delta x/\omega_o$ is set to 4.5 in the embodiment.

Incidentally, the wavelength range is as wide as from 1250 nm to 1650 nm, and accordingly, in the arrayed waveguide diffraction grating designed as described above, there is a loss around 1380 nm, for example, due to absorption by an OH group in the quartz glass constituting the waveguides. However, this wavelength band is not used for transmission, and therefore does not affect operation characteristics of the arrayed waveguide diffraction grating. Calculation regarding the absorption by the OH group in the quartz glass constituting the waveguides is not taken into account in the calculation result shown in FIG. 4.

Also, the above-described arrayed waveguide diffraction grating has a channel interval of 50 nm, and temperature dependence of demultiplexing wavelength of an interference filter in which quartz-based waveguides are used is 0.01 nm/° C. Even when it is assumed that the temperature of an environment in which the arrayed waveguide diffraction grating is used changes by 40° C. from −5° C. to 35° C. between cases where the grating is used outdoors and indoors, according to the above-described temperature dependence, a wavelength variation is about 0.4 nm, which is no greater than 1/100 of the interval between adjacent channels and does not affect demultiplexing characteristics. Therefore, it is not necessary to control temperature using a Peltier element or the like when the above-described arrayed waveguide diffraction grating is actually used.

Also, in the case of quartz-based waveguides, TE/TM polarization dependence of the transmission spectrum is about 0.1 to 0.2 nm, but in the arrayed waveguide diffraction grating, the interval between adjacent channels, i.e., resolution is as large as 50 nm, and therefore the polarization dependence is negligible.

Embodiment 2

Next, a wavelength checker according to Embodiment 2 of the present invention will be described with reference to FIGS. 5A, 5B, and 5C.

The wavelength checker includes the optical waveguide chip 101. The optical waveguide chip 101 is the same as that in Embodiment 1 described above. The wavelength checker also includes an optical waveguide chip 121 that is arranged next to the optical waveguide chip 101 and includes optical waveguides that guide outgoing light. A plurality of linear optical waveguides are formed in the optical waveguide chip 121. For example, eight linear optical waveguides that correspond to the eight output waveguides of the optical waveguide chip 101 are formed in the optical waveguide chip 121. Also, the eight linear optical waveguides are arranged at 1 mm intervals, which are the same as intervals between output ends of the eight output waveguides of the optical waveguide chip 101.

In Embodiment 2, a surface of the light conversion portion 102 toward which the outgoing light is emitted is arranged so as to face an output end of the optical waveguide chip 121 from which the outgoing light is output to the outside. The light conversion portion 102 is the same as that in Embodiment 1 described above. Also, the optical waveguide chip 121 is arranged next to the optical waveguide chip 101 in series in a wave guiding direction.

In Embodiment 2, the optical waveguide chip 101 and the optical waveguide chip 121 are mounted on an optical waveguide chip 141. That is, the optical waveguide chips are stacked in two layers. The lower optical waveguide chip is defined as a parent optical waveguide chip and the upper optical waveguide chips are defined as child optical waveguide chips. Accordingly, hereinafter, the optical waveguide chips will be referred to as the child optical waveguide chip 101, the child optical waveguide chip 121, and the parent optical waveguide chip 141. A planar light wave circuit may be formed in the parent optical waveguide chip 141, but a configuration is also possible in which the parent optical waveguide chip 141 does not include an optical circuit (only clad glass is provided on an Si substrate). The child optical waveguide chip 101 and the optical waveguide chip 121 are mounted on the parent optical waveguide chip 141 with spacers (not shown) interposed therebetween, such that surfaces (surfaces constituted by clad glass) in which optical waveguides (planar light wave circuits) are formed face the parent optical waveguide chip 141 (a surface thereof constituted by clad glass).

Here, optical waveguide chips through which light is passed are the child optical waveguide chips. When the surfaces constituted by clad glass are referred to as front surfaces, rear surfaces of the child optical waveguide chips, which are constituted by Si substrates, can be seen from above. That is, in each of the child optical waveguide chips, an optical circuit portion that is constituted by cores and a clad layer is on the lower side. Also, the parent optical waveguide chip 141 is mounted on the main substrate 151. For example, the parent optical waveguide chip 141 is fixed on the main substrate 151 by being bonded with an adhesive. The child optical waveguide chips 101 and 121 are arranged side by side along the direction in which light is input.

The light conversion portion 102 is the same as that in Embodiment 1, and is arranged on an optical path of reflected light that is emitted from the output end 108 and reflects off the reflection surface 109a, on the upper side of the reflection surface 109a (reflection film 109b) of the reflection portion 109. More specifically, the right-angle prism 110 is provided on the reflection portion 109. The right-angle prism 110 includes the light incident surface that faces the output end 108, the light emission surface that is orthogonal to the light incident surface, and the sloped surface that is adjacent to the light incident surface and the light emission surface. The sloped surface of the right-angle prism 110 faces the reflection surface 109a (FIG. 2C). The light conversion portion 102 can be formed by applying a conversion material that converts infrared light to visible light, to the light emission surface of the right-angle prism 110, for example.

Note that the fiber block 161 is connected to an input waveguide end of the child optical waveguide chip 101. The optical fiber 162 provided with the connector 163 for inputting an optical signal that is to be checked is connected to the fiber block 161. Note that another optical fiber (not shown) provided with a connector is used for alignment between the fiber block 161 and the input waveguide of the child optical waveguide chip 101. Also, the child optical waveguide chip 101 is fixed by being bonded to the parent optical waveguide chip 141 with an adhesive via spacers (not shown) interposed therebetween. On the other hand, the child optical waveguide chip 121 is in a semi-fixed state and is attachable to and detachable from the parent optical waveguide chip 141 and can be replaced.

Figure 6A:
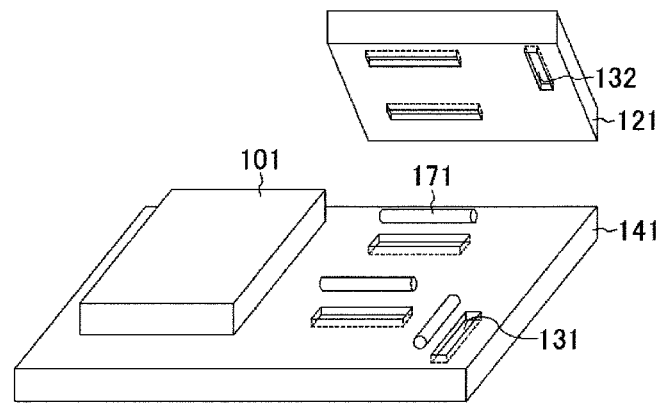
FIG. 6A is a perspective view showing a configuration of a portion of the wavelength checker according to Embodiment 2 of the present invention.
Figure 6B:
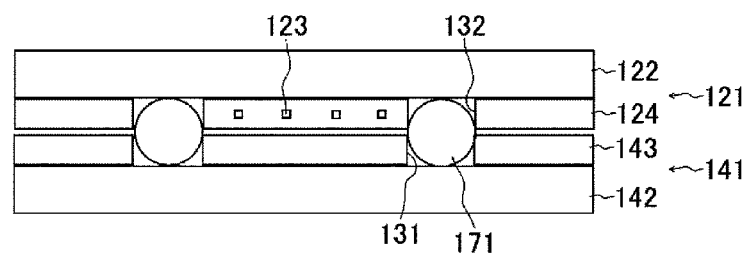
FIG. 6B is a cross-sectional view showing a configuration of a portion of the wavelength checker according to Embodiment 2 of the present invention.

Here, positioning of the child optical waveguide chips 101 and 121 on the parent optical waveguide chip 141 will be described with reference to FIGS. 6A and 6B. First, a plurality of first grooves 131 are formed in the parent optical waveguide chip 141, and second grooves 132 are formed in the child optical waveguide chips 101 and 121. A plurality of spacer members 171 are fitted in the first grooves 131 such that portions of the spacer members 171 protrude from the parent optical waveguide chip 141. The second grooves 132 in the child optical waveguide chip 101 and the second grooves 132 in the child optical waveguide chip 121 are each fitted on a protruding portion of any of the spacer members 171. Note that positions of the second grooves 132 are set so as to avoid waveguide portions (cores) of the child optical waveguide chips 101 and 121. The number of grooves can be usually set to at least three.

The first grooves 131 are formed in a clad layer 143 of the parent optical waveguide chip 141. The first grooves 131 are formed so as to extend through the clad layer 143 and reach a substrate 142. Similarly, the second grooves 132 are formed in a clad layer 124 of the child optical waveguide chip 121 that includes cores 123. The second grooves 132 are formed so as to extend through the clad layer 124 and reach a substrate 122.

The first grooves 131 and the second grooves 132 can be formed using known photolithography technique and etching technique (reactive ion etching or the like). The first grooves 131 are formed by etching the clad layer 143 by using a mask pattern formed using the photolithography technique as a mask, and using the substrate 142 as an etching stop layer. Similarly, the second grooves 132 are formed by etching the clad layer 124 by using a mask pattern formed using the photolithography technique as a mask, and using the substrate 122 as an etching stop layer.

Position accuracy (displacement amount) in in-plane directions of the first grooves 131 and the second grooves 132 formed as described above with respect to designed positions is determined by position accuracy of the mask pattern and an amount of displacement during etching. As is well known, the position accuracy of the mask pattern is submicron or less, and the amount of displacement during reactive ion etching is also submicron or less. Accordingly, the positions of the first grooves 131 and the second grooves 132 in in-plane directions are within 1 μm or less from the designed positions.

Also, the depth of the first grooves 131 is determined by the thickness of the clad layer 143, and the depth of the second grooves 132 is determined by the thickness of the clad layer 124. Accuracy of the thicknesses of the clad layers 143 and 124 is determined on the order of submicron with use of well-known glass deposition technique, for example. Similar can be said for positions in the thickness direction of the cores 123 that are embedded in the clad layer 124.

Here, the spacer members 171 can be formed by cutting an optical fiber into a predetermined length, for example, and accuracy of the diameter of each spacer member 171 can be determined on the order of submicron. Accordingly, position accuracy of the child optical waveguide chip 121 in the thickness direction is also determined within a range of 1 μm or less.

For the reasons described above, it is possible to exactly match positions of core centers of corresponding waveguides of the child optical waveguide chip 101 and the child optical waveguide chip 121 mounted on the parent optical waveguide chip 141. Note that positioning between a plurality of child chips that are mounted on a parent optical chip as described above is commonly performed in a state where each chip is not warped. For more detailed descriptions, refer to Reference Documents 4, 5, and 6. This optical mounting configuration is called PPCP (Pluggable Photonic Circuit Platform). The child optical waveguide chip 121 mounted according to the PPCP is characterized in that the chip is attachable and detachable. Therefore, it is possible to use child optical waveguide chips 121 having various functions by replacing the chips to flexibly impart the various functions. In other words, the PPCP can be said to have a characteristic of an optical circuit (optical chip) version of an electronic block.

Next, manufacture of the child optical waveguide chip 121 will be described with reference to FIGS. 7A to 7E.

Figure 7A:
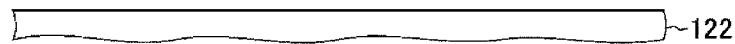
FIG. 7A is a cross-sectional view showing a method for manufacturing a child optical waveguide chip that constitutes the wavelength checker according to Embodiment 2 of the present invention.
Figure 7B:
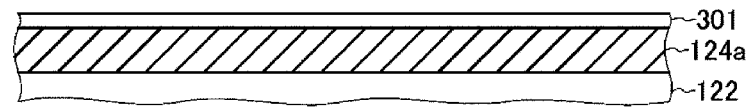
FIG. 7B is a cross-sectional view showing the method for manufacturing the child optical waveguide chip constituting the wavelength checker according to Embodiment 2 of the present invention.

First, as shown in FIG. 7A, the substrate 122 that is constituted by Si is prepared. Next, as shown in FIG. 7B, a lower clad layer 124a is formed on the substrate 122, and a core formation layer 301 is formed on the lower clad layer 124a.

The lower clad layer 124a and the core formation layer 301 can be formed using a flame hydrolysis deposition (FHD) method, for example. First, raw material gas (main component: tetrachlorosilicon) is passed through oxyhydrogen flame to deposit thermally hydrolyzed glass microparticles on the substrate 122 and form a first microparticle layer that is to be converted to the lower clad layer 124a. Subsequently, glass microparticles having a different composition are deposited on the first microparticle layer by changing the composition of the raw material gas (changing the concentration of $GeO_2$ dopant) to form a second microparticle layer that is to be converted to the core formation layer 301. Thereafter, the first microparticle layer and the second microparticle layer are heated using an electric furnace or the like, for example, to convert each of the layers to a transparent film having a glass composition, and thus the lower clad layer 124a and the core formation layer 301 are obtained. Note that these layers can also be formed using a chemical vapor deposition method.

Figure 7C:
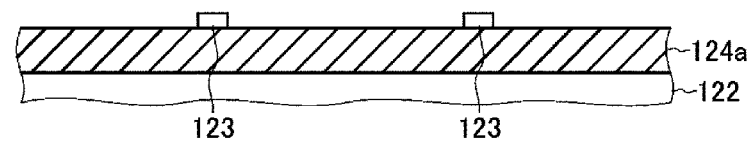
FIG. 7C is a cross-sectional view showing the method for manufacturing the child optical waveguide chip constituting the wavelength checker according to Embodiment 2 of the present invention.

Next, the core formation layer 301 is patterned using known lithography technique and etching technique that are used in manufacture of semiconductor devices, to form the cores 123 as shown in FIG. 7C. For example, a resist pattern is formed on portions of the core formation layer 301 that are to be used as the cores 123, by using photolithography technique. Next, the core formation layer 301 is etched by reactive ion etching (RIE) using the formed resist pattern as a mask to leave the portions to be used as the cores 123 and remove the other portions of the core formation layer. Thereafter, the resist pattern is removed, and thus the cores 123 are formed.

Figure 7D:
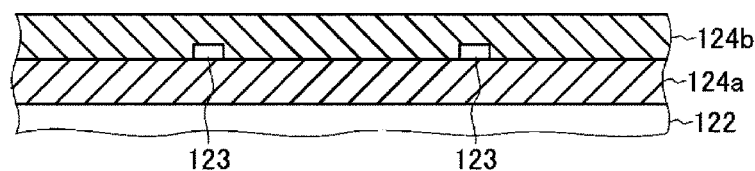
FIG. 7D is a cross-sectional view showing the method for manufacturing the child optical waveguide chip constituting the wavelength checker according to Embodiment 2 of the present invention.

Next, as shown in FIG. 7D, an upper clad layer 124b is formed on the cores 123. Similarly to the lower clad layer 124a described above, the upper clad layer 124b can be formed using the FHD method.

Figure 7E:
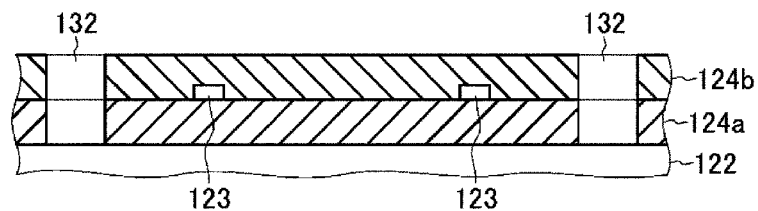
FIG. 7E is a cross-sectional view showing the method for manufacturing the child optical waveguide chip constituting the wavelength checker according to Embodiment 2 of the present invention.

Next, the upper clad layer 124b and the lower clad layer 124a are patterned using known lithography technique and etching technique to form the second grooves 132 that extend through the upper clad layer 124b and the lower clad layer 124a and reach the substrate 122 as shown in FIG. 7E. For example, a resist pattern that includes openings at positions at which the second grooves 132 are to be formed is formed on the upper clad layer 124b by using photolithography technique. Next, the upper clad layer 124b and the lower clad layer 124a are etched by the RIE using the formed resist pattern as a mask to remove portions at which the second grooves 132 are to be formed. Thereafter, the resist pattern is removed, and thus the second grooves 132 are formed. Particularly in a case where the upper clad layer 124b and the lower clad layer 124a are constituted by quartz-based glass and these layers are processed by the RIE, the substrate 122 formed of silicon serves as an etching stop layer.

Figure 8A:
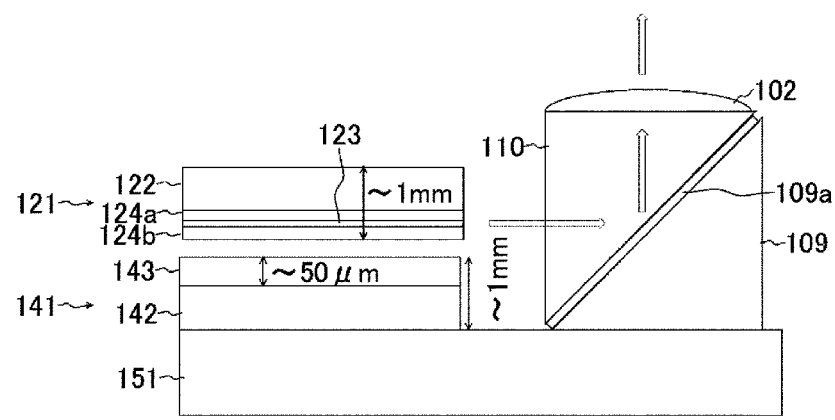
FIG. 8A is a cross-sectional view showing a configuration in the vicinity of a light conversion portion of the wavelength checker according to Embodiment 2 of the present invention.
Figure 8B:
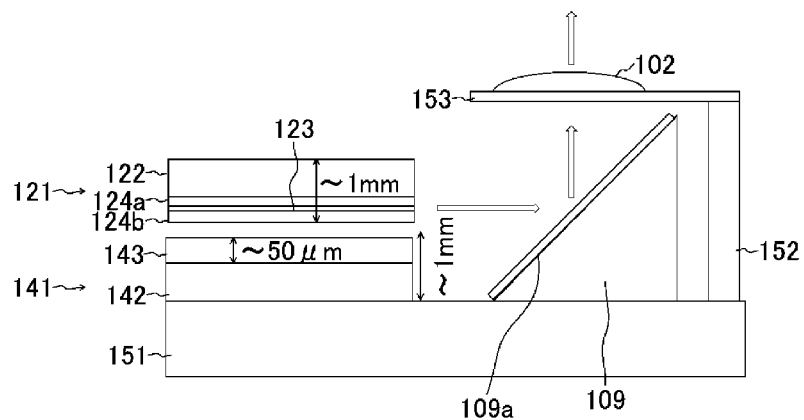
FIG. 8B is a cross-sectional view showing another configuration in the vicinity of the light conversion portion of the wavelength checker according to Embodiment 2 of the present invention.

FIGS. 8A and 8B show enlarged cross sections of an emission portion of the child optical waveguide chip 121. FIG. 8A shows a configuration in which the right-angle prism 110 is provided on the reflection portion 109 and the light conversion portion 102 is provided on the light emission surface of the right-angle prism 110. FIG. 8B shows a configuration in which the light conversion portion 102 is provided on a plate surface of the transparent plate 153 that is supported by the support portion 152 above the main substrate 151. Assume that light is guided through the optical waveguides with a mode field diameter (MFD) of 6 μm (=spot size of 3 μm), for example. This mode field diameter corresponds approximately to a mode field diameter that is realized with an optical waveguide of which the core has a cross section of 4.5 μm×4.5 μm (rectangular) and in which a relative refractive index difference between the core and the clad is 1.5%, for example. Note that the spot size is half the MFD.

When light having the MFD of 6 μm is emitted from an end surface, the beam spreads due to diffraction. In the following, the spread of the beam will be calculated by approximating an electric field distribution within the optical waveguide to a Gaussian distribution. Here, light (near infrared light) that is emitted from the child optical waveguide chip 121, enters the right-angle prism 110, and is reflected toward the upper side of the main substrate 151 passes through the air and the right-angle prism 110 that is constituted by glass. The right-angle prism 110 has a higher refractive index than the air, and accordingly, when the beam passes through the right-angle prism 110, the spread of the beam diameter is suppressed when compared to passing through the air. In the following, the spread of the beam is calculated assuming that the beam is conducted through the air all the way, to allow a margin.

When the spot size at the emission end is represented by $\omega_o$, a diameter of the beam that has propagated by a distance of z from the emission end surface is expressed by expression (6). Details of this are described in Reference Document 7. In expression (6), λ represents the wavelength. Under conditions where the squared term in √ in expression (6) is sufficiently larger than 1 (in this case, z>about 100 μm), expression (6) can be approximated to expression (7).

Math 5

$$\omega(z) = \omega_0\sqrt{1+\left(\frac{\lambda z}{\pi\omega_0^2}\right)^2} \quad (6)$$

$$\omega(z) \cong \omega_0\left(\frac{\lambda z}{\pi\omega_0^2}\right) \quad (7)$$

Figure 9:
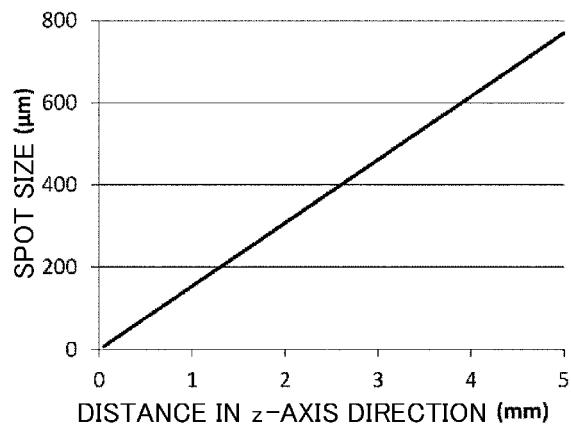
FIG. 9 is a characteristic diagram obtained by plotting expression (7).

FIG. 9 shows a graph obtained by plotting expression (7). When a distance by which light emitted from the child optical waveguide chip 121 travels until reaching the light conversion portion 102 by being reflected by the reflection portion 109 is estimated, the region to be considered is from about z=5 mm, and it can be found that accurate values can be obtained. When inferred from FIG. 9, in other words, according to expression (7), when light has propagated by a distance of about 6 mm, the spot size is 1000 μm, and the MFD is 2 mm, which is the same as the optical waveguide pitch (the spot size is half the MFD). It can be understood that if a distance between the emission end of the child optical waveguide chip 121 and the light conversion portion 102 is greater than this distance, it is difficult to distinguish lights emitted from adjacent channels (i.e., visible lights converted from the emitted lights).

Here, the upper clad layer 124b of the child optical waveguide chip 121 is thin (30 μm or less) and the clad layer 143 of the parent optical waveguide chip 141 is thin (50 μm or less), and therefore, if the emission side end surface of the child optical waveguide chip 121 is spaced farther away from the light conversion portion 102 than the light conversion portion 102 side end surface of the parent optical waveguide chip 141 is, light emitted from the child optical waveguide chip 121 enters the clad layer 143 and the substrate 142 of the parent optical waveguide chip 141 and is refracted. In such a state, the near infrared light beam that is reflected by the reflection portion 109 and is emitted toward the light conversion portion 102 deforms and is difficult to recognize. The quartz-based glass constituting the clads has a refractive index of 1.4 to 1.5, while air has a refractive index of 1, and Si constituting the substrate has a refractive index of 3.5 and has a larger difference in refractive index from air, and accordingly, the refractive angle further increases.

Therefore, it is important that the emission side (the light conversion portion 102 side) end surface of the child optical waveguide chip 121 is at the same position as the light conversion portion 102 side end surface of the parent optical waveguide chip 141 with respect to the light conversion portion 102 or is closer to the light conversion portion 102 than the light conversion portion 102 side end surface of the parent optical waveguide chip 141 is.

Figure 5A:
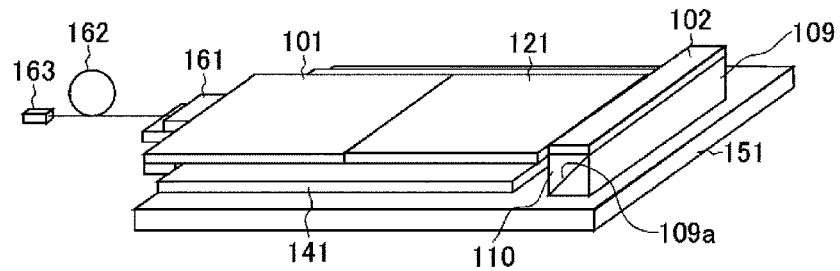
FIG. 5A is a perspective view showing a configuration of a wavelength checker according to Embodiment 2 of the present invention.
Figure 5B:
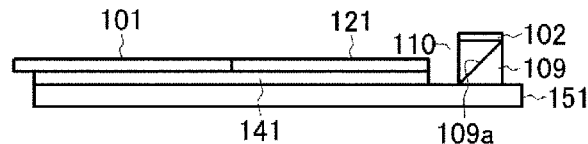
FIG. 5B is a side view showing a configuration of a portion of the wavelength checker according to Embodiment 2 of the present invention.
Figure 5C:
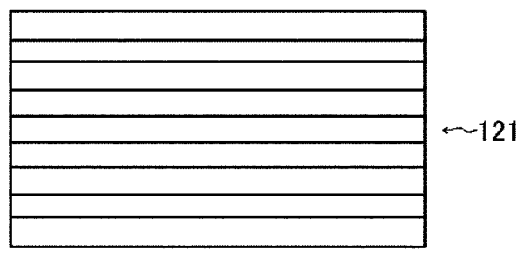
FIG. 5C is a plan view showing a configuration of a portion of the wavelength checker according to Embodiment 2 of the present invention.

Note that, in the wavelength checker according to Embodiment 2 described using FIGS. 5A, 5B, and 5C, the transmission spectrum of the child optical waveguide chip 121 is the same as that in Embodiment 1, and the spectrum shown in FIG. 4 is obtained.

Figure 10:
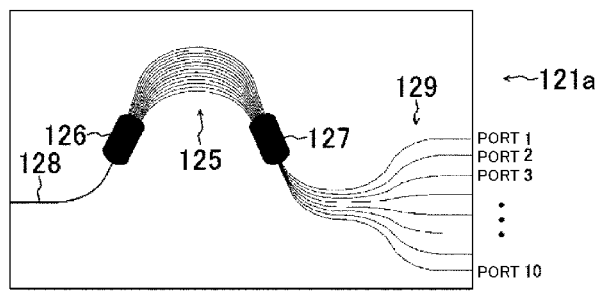
FIG. 10 is a plan view showing a configuration of a portion of another wavelength checker according to Embodiment 2 of the present invention.

Incidentally, as shown in FIG. 10, it is also possible to use a child optical waveguide chip 121a that includes an arrayed waveguide diffraction grating, in place of the child optical waveguide chip 121. The child optical waveguide chip 121a includes the arrayed waveguide diffraction grating that has a narrow interval between demultiplexing wavelengths. In FIG. 10, the reference sign 125 denotes a second arrayed waveguide, the reference sign 126 denotes a second input-side slab waveguide, the reference sign 127 denotes a second output-side slab waveguide, the reference sign 128 denotes a second input waveguide, and the reference sign 129 denotes second output waveguides. This is an ordinary arrayed waveguide diffraction grating in which the second arrayed waveguide 125 has an arcuate shape in a plan view. The arrayed waveguide diffraction grating has demultiplexing wavelengths from 1550 nm to 1600 nm, a demultiplexing wavelength interval of 5 nm, and ten ports. In FIG. 10, some of the second output waveguides 129 are omitted.

Figure 11:
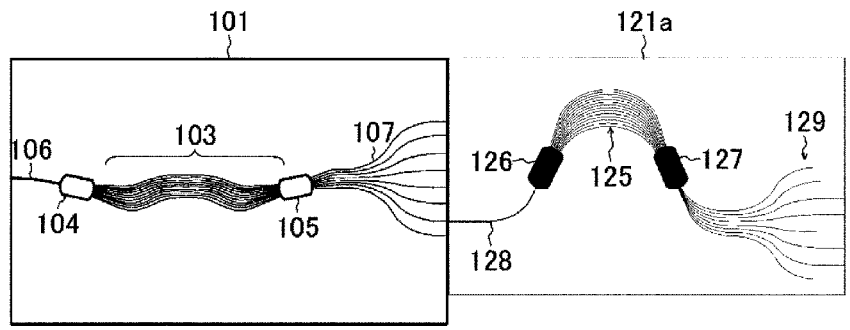
FIG. 11 is a plan view showing a configuration of a portion of the other wavelength checker according to Embodiment 2 of the present invention.
Figure 12:
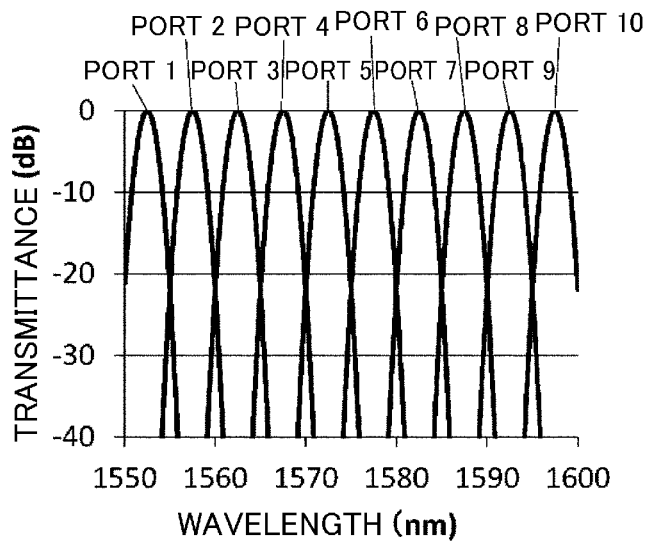
Figure 13:
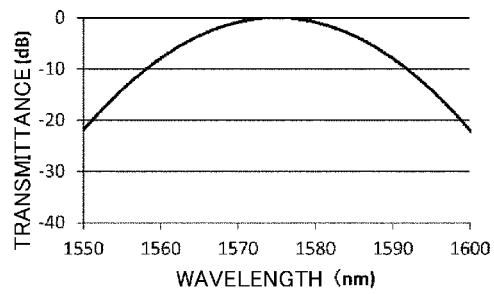
FIG. 13 is a characteristic diagram showing a calculation result of a transmission spectrum of an arrayed waveguide diffraction grating in an optical waveguide chip 101.
Figure 14:
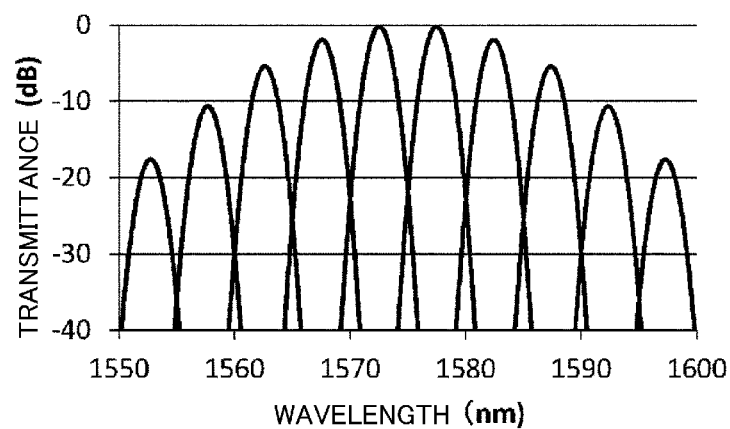
FIG. 14 is a characteristic diagram showing a spectrum obtained by compositing the spectrum shown in FIG. 12 and the spectrum shown in FIG. 13.

FIG. 11 shows a state of connection between the child optical waveguide chip 101 and the child optical waveguide chip 121a. The following considers a case where the second input waveguide 128 of the child optical waveguide chip 121a is optically connected to the port 7 of the first output waveguides 107 of the child optical waveguide chip 101 as shown in FIG. 11. FIG. 12 shows a transmission wavelength spectrum of the arrayed waveguide diffraction grating (having the narrow demultiplexing wavelength interval) of the child optical waveguide chip 121 of this case. This spectrum is a result of calculation performed using expression (5). On the other hand, the transmission spectrum of the arrayed waveguide diffraction grating of the child optical waveguide chip 101 is a broad spectrum as shown in FIG. 13. The transmission spectrum of the configuration in which the child optical waveguide chip 101 and the child optical waveguide chip 121a are connected is a composite of the spectrum shown in FIG. 12 and the spectrum shown in FIG. 13 and is shown in FIG. 14.

In the case where the child optical waveguide chip 121 constituted by the linear optical waveguides is combined with the child optical waveguide chip 101, the transmission spectrum is as shown in FIG. 4, and the wavelength resolution is 50 nm. In contrast, in the transmission spectrum of the case where the child optical waveguide chip 121a constituted by the arrayed waveguide diffraction grating is combined with the child optical waveguide chip 101, the wavelength resolution is 5 nm, and it can be understood that the wavelength can be checked more precisely.

Also, in the configuration in which the child optical waveguide chip 121 is combined with the child optical waveguide chip 101, the measurement range is from 1250 nm to 1650 nm and is as wide as 400 nm as shown in FIG. 4. In contrast, in the configuration in which the child optical waveguide chip 121a is combined with the child optical waveguide chip 101, the measurement range is narrow as shown in FIG. 14.

As described above, by mounting the child optical waveguide chips 121 and 121a according to the PPCP so as to be replaceable with each other, it is possible to flexibly change the wavelength resolution and the measurement range of the wavelength checker.

In the above-described case, the wavelength is precisely checked with respect to the wavelength range from 1550 nm to 1600 nm by using the arrayed waveguide diffraction grating having the narrow wavelength interval, but it can be understood that it is possible to check the wavelength with the wavelength resolution of 5 nm in another wavelength range as well by preparing an arrayed waveguide diffraction grating that has 10 ports at 5 nm intervals corresponding to a wavelength range of another output port of the arrayed waveguide diffraction grating of the child optical waveguide chip 101, and by connecting the prepared arrayed waveguide diffraction grating to the output port.

Here, the arrayed waveguide diffraction grating having the narrow demultiplexing wavelength interval will be additionally described. An arrayed waveguide diffraction grating of which the free spectral range (FSR) is equal to a product of the channel interval and the number of channels is called a cyclic arrayed waveguide diffraction grating. If the cyclic arrayed waveguide diffraction grating is used as the arrayed waveguide diffraction grating having the narrow wavelength interval, the same cyclic arrayed waveguide diffraction grating can be shared as an optical chip to be connected to the child optical waveguide chip 101. However, the arrayed waveguide diffraction grating cannot be shared between channels of which wavelengths are too far, such as the 1500 nm band and the 1300 nm band, because a refractive index difference increases due to influence of refractive index dispersion.

Although a device structure of the wavelength checker has been described above, the following gives a supplementary description from the standpoint of a wavelength inspection method. As a method for inspecting the wavelength in an access-type PON system, it is possible to propose an inspection method of demultiplexing light according to wavelengths by the arrayed waveguide diffraction grating, emitting the demultiplexed light toward a material (wavelength conversion material) that converts near infrared light to visible light, and checking the wavelength by seeing a port from which light is emitted. A broad interpretation of the arrayed waveguide diffraction grating is a diffraction grating (grating), and accordingly, it is also possible to propose an inspection method of demultiplexing light according to wavelengths by the diffraction grating (grating), emitting the demultiplexed light toward the wavelength conversion material, and checking the wavelength by seeing a position from which light is emitted. These inspection methods are characterized in that wavelength inspection can be easily performed without using a power source or the like.

Embodiment 3

Figure 15:
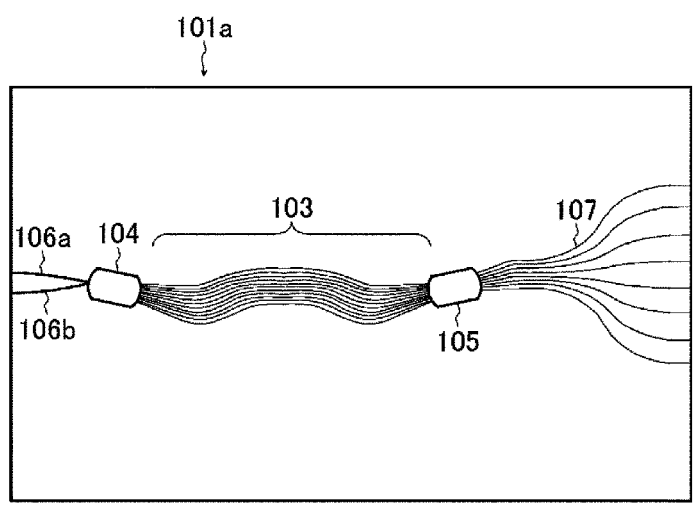
FIG. 15 is a plan view showing a configuration of a portion of a wavelength checker according to Embodiment 3 of the present invention.

Next, a wavelength checker according to Embodiment 3 of the present invention will be described with reference to FIG. 15. In Embodiment 3, a child optical waveguide chip 101a shown in FIG. 15 is used instead of the child optical waveguide chip 101 in the wavelength checker described using FIGS. 5A, 5B, and 5C. In the child optical waveguide chip 101a, a main first input waveguide 106a and a sub first input waveguide 106b are connected to the input side of the first input-side slab waveguide 104. The other configurations are the same as those in the child optical waveguide chip 101, and the child optical waveguide chip 101a is constituted by a plurality of linear optical waveguides.

Here, when a waveguide interval between portions of the plurality of first output waveguides 107 that are connected to the first output-side slab waveguide 105 is represented by $\Delta x_{out}$, a waveguide interval between a portion of the main first input waveguide 106a that is connected to the first input-side slab waveguide 104 and a portion of the sub first input waveguide 106b that is connected to the first input-side slab waveguide 104 is $\Delta x_{out}/2$. Also, in the child optical waveguide chip 101a, shapes of the first input-side slab waveguide 104, the first arrayed waveguide 103, and the first output-side slab waveguide 105 in a plan view are symmetrical with respect to a straight line that extends through the middle point of a line segment connecting the center of the first input-side slab waveguide 104 and the center of the first output-side slab waveguide 105 and that is perpendicular to the line segment. The side of the first input-side slab waveguide 104 that is in contact with the input waveguides and the side of the first input-side slab waveguide 104 that is in contact with the arrayed waveguide are arcs having the same curvature. Therefore, the center of the input-side slab waveguide is an intersection point between straight lines that diagonally connect four points at which straight lines and the arcs that constitute the external shape of the slab waveguide intersect. Similar can be said for the first output-side slab waveguide 105.

The following describes more details.

Figure 16A:
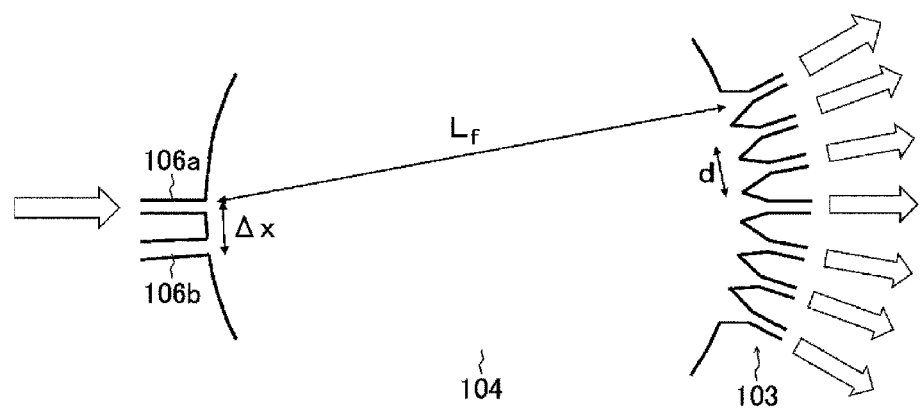
FIG. 16A is a plan view showing a configuration of a portion of the wavelength checker according to Embodiment 3 of the present invention.
Figure 16B:
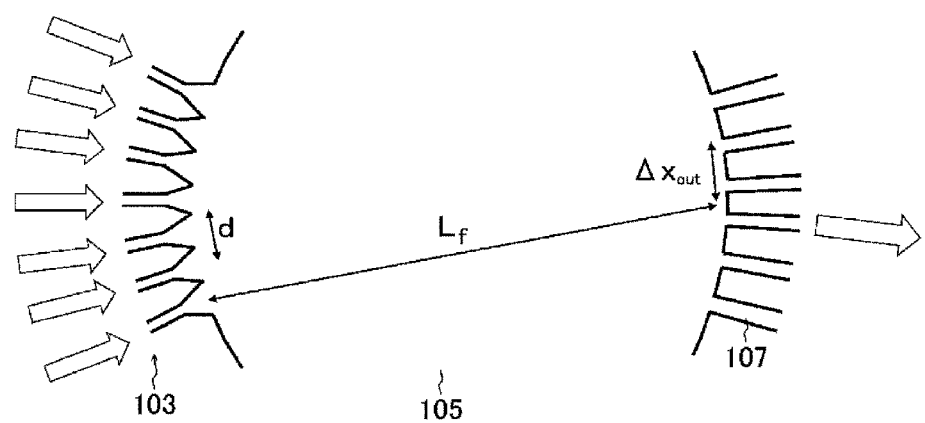
FIG. 16B is a plan view showing a configuration of a portion of the wavelength checker according to Embodiment 3 of the present invention.

The main first input waveguide 106a is connected to the center of the first input-side slab waveguide 104. Assume that the first output waveguides 107 are connected at the waveguide interval $\Delta x_{out}$ with respect to the center of the first output-side slab waveguide 105, and transmission center wavelengths of the respective first output waveguides 107 are set at equal wavelength intervals to $\lambda 1, \lambda 2, \lambda 3, \ldots, $ and $\lambda 8$. Also, the sub first input waveguide 106b is connected to the first input-side slab waveguide 104 at a waveguide interval of $\Delta x = \Delta x_{out}$ with respect to the main first input waveguide 106a (see FIGS. 16A and 16B).

If the shapes of the first input-side slab waveguide 104, the first arrayed waveguide 103, and the first output-side slab waveguide 105 in a plan view are symmetrical as described above, the following holds true.

When the sub first input waveguide 106b is connected so as to be shifted from the main first input waveguide 106a, wavelength-division-multiplexed light that is input to the sub first input waveguide 106b is separated at equal intervals such that transmission center wavelengths of the first output waveguides 107 are $\lambda 2, \lambda 3, \lambda 4, \ldots,$ and $\lambda 9$. This is because, due to the sub first input waveguide 106b being shifted by an amount corresponding to a single waveguide, a wavefront that reaches the first arrayed waveguide 103 is inclined and consequently, a wavefront that reaches the first output waveguides 107 is inclined, and light having the same wavelength is collected to a first output waveguide 107 that is next to the first output waveguide 107 to which the light is collected when input to the main first input waveguide.

In the arrayed waveguide diffraction grating, there is a linear relationship between a position of connection between the slab waveguide and the input waveguide and the transmission center wavelength. Details are described in Reference Document 8. Accordingly, when the waveguide interval between the main first input waveguide 106a and the sub first input waveguide 106b is $\Delta x = \Delta x_{out}/2$ and an interval between center wavelengths of adjacent channels is represented by $\Delta \lambda$, the transmission center wavelengths are $\lambda 1 + \Delta \lambda / 2, \lambda 2 + \Delta \lambda / 2, \lambda 3 + \Delta \lambda / 2, \ldots,$ and $\lambda 8 + \Delta \lambda / 2$. Note that $\Delta \lambda = \lambda 2 - \lambda 1 = \lambda 3 - \lambda 2 = \ldots = \lambda 9 - \lambda 8$.

Figure 17A:
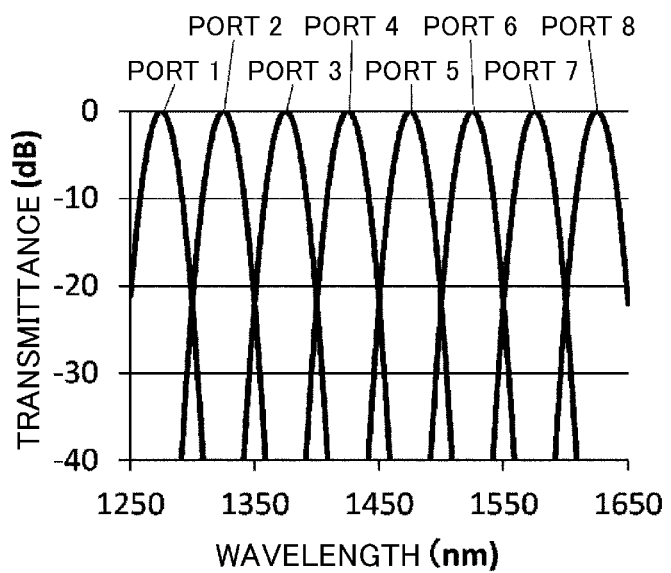
FIG. 17A is a characteristic diagram showing a calculation result of a spectrum of light that is input from a main first input waveguide 106a of an optical waveguide chip 101a and is transmitted through an arrayed waveguide diffraction grating.

When the arrayed waveguide diffraction grating of the child optical waveguide chip 101a is designed similarly to the child optical waveguide chip 101, the spectrum (calculation value) of light that is input from the main first input waveguide 106a and is transmitted through the arrayed waveguide diffraction grating is the same as the transmission spectrum of the child optical waveguide chip 101 as shown in FIG. 17A. That is, the transmission center wavelengths of the first output waveguides 107 are 1275 nm, 1325 nm, 1375 nm, 1425 nm, 1475 nm, 1525 nm, 1575 nm, and 1625 nm.

Figure 17B:
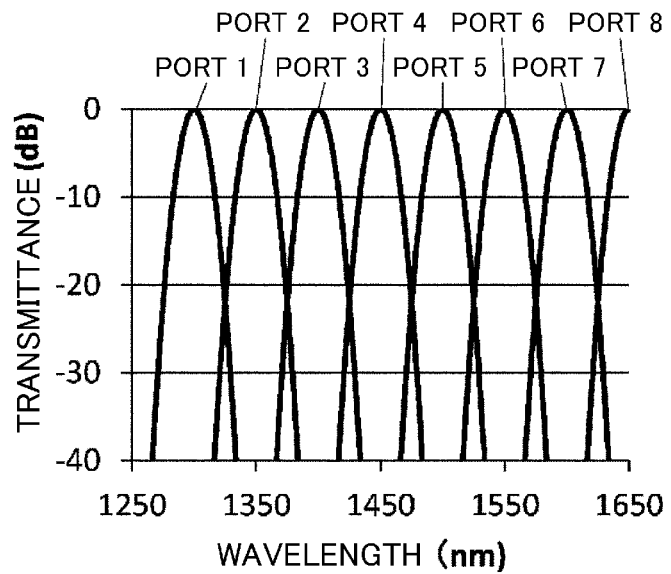
FIG. 17B is a characteristic diagram showing a calculation result of a spectrum of light that is input from a sub first input waveguide 106b of the optical waveguide chip 101a and is transmitted through the arrayed waveguide diffraction grating.

On the other hand, the spectrum (calculation value) of light that is input from the sub first input waveguide 106b and is transmitted through the arrayed waveguide diffraction grating is shifted by half the wavelength interval and the transmission center wavelengths are 1300 nm, 1350 nm, 1400 nm, 1450 nm, 1500 nm, 1550 nm, 1600 nm, and 1650 nm as shown in FIG. 17B. That is, the transmission spectrum of the light input from the main first input waveguide 106a and the spectrum of the light input from the sub first input waveguide 106b are alternate with each other.

When compared with a case where a single input waveguide is provided for the arrayed waveguide diffraction grating, the configuration in which the main first input waveguide 106a and the sub first input waveguide 106b are provided has the following effects. In the case where the single input waveguide is provided, when light having a wavelength that is between transmission spectrums of adjacent first output waveguides 107 is input, transmittance is low, and accordingly, visible light converted from the near infrared light is weak, and the light emitted from the light conversion portion 102 may not be recognized.

For example, transmitted light intensities of the ports 1 and 2 at a wavelength of 1300 nm in FIG. 17A are lower by 20 dB than that at wavelengths (1275 nm and 1325 nm) at which transmittance is the highest.

Figure 18:
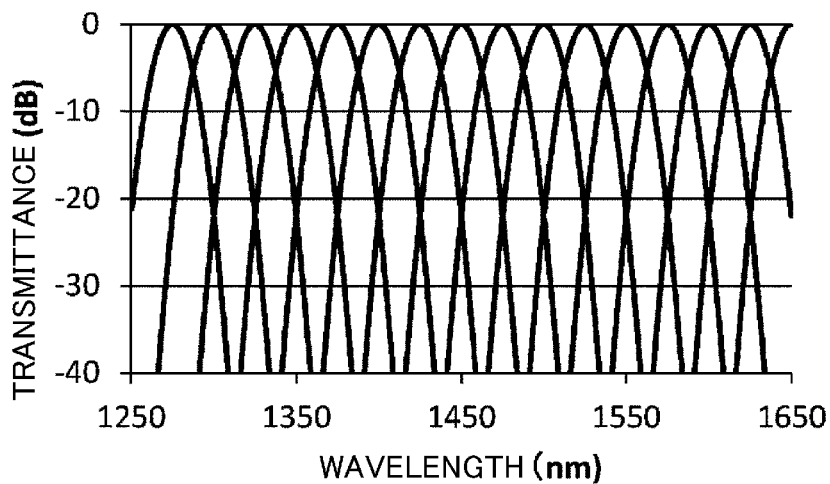
FIG. 18 is a characteristic diagram showing a spectrum obtained by compositing the spectrum shown in FIG. 17A and the spectrum shown in FIG. 17B.
Figure 19:
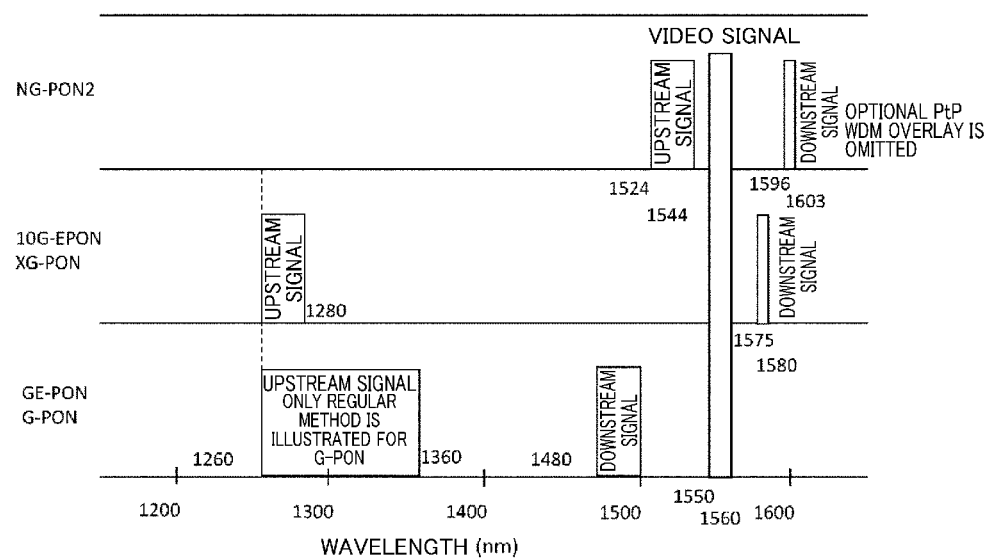
FIG. 19 is an illustrative diagram showing a wavelength arrangement relationship between NG-PON2, 10G-EPON (XG-PON), and GE-PON (G-PON).

In contrast, in the case where the main first input waveguide 106a and the sub first input waveguide 106b are used, when signal light is also input to the sub first input waveguide 106b, the transmitted light intensity of the port 1 at the wavelength of 1300 nm is that at wavelengths at which transmittance is the highest. As a result, as shown in FIG. 18 in which FIGS. 17A and 17B are superposed, when the main first input waveguide 106a and the sub first input waveguide 106b are used, a reduction in the transmitted light intensity is only 5 dB even at wavelengths at which the transmittance is the lowest, when compared with the transmitted light intensity at wavelengths at which the transmittance is the highest.

Therefore, even if the wavelength cannot be recognized due to the transmitted light intensity of signal light being low when the signal light is input to a single input waveguide, if the signal light is input to both the main first input waveguide 106a and the sub first input waveguide 106b, stronger light is emitted from the light conversion portion 102 and the wavelength can be recognized more reliably.

As described above, according to embodiments of the present invention, the light conversion portion constituted by the conversion material that converts infrared light to visible light is arranged on the optical path of reflected light that is emitted from the light emission end surface of the optical waveguide chip on the side from which light is output to the external space and that reflects off the reflection surface of the reflection portion provided at a position on the main substrate at which the reflection portion faces the light emission end surface, on the upper side of the reflection surface, and therefore, it is possible to easily check the presence or absence of signal light when starting a PON system or isolating a failure in the PON system, for example.

The present invention is not limited to the embodiments described above, and it is apparent that a person having ordinary skill in the art can make many modifications and combinations within the technical idea of the present invention.

[Reference Document 1] Japanese Patent Application Publication No. H10-104446

[Reference Document 2] Hiroshi Takahashi, et al., "Arrayed Waveguide Diffraction Grating for WDM", NTT R&D, vol. 46, no. 7, pp. 685-692, 1997.

[Reference Document 3] H. Takahashi et al., "Transmission Characteristics of Arrayed Waveguide N×N Wavelength Multiplexer", Journal of Lightwave Technology, vol. 13, no. 3, pp. 447-455, 1995.

[Reference Document 4] Japanese Patent Application Publication No. 2017-32950

[Reference Document 5] H. Ishikawa et al., "Pluggable Photonic Circuit Platform Using a Novel Passive Alignment Method", The Japan Society of Applied Physics, 22nd Microoptics Conference, D-6, pp. 84-85, 2017.
[Reference Document 6] K. Shikama et al., "Pluggable photonic circuit platform for single-mode waveguide connections using novel passive alignment method", Japanese Journal of Applied Physics, vol. 57, 08PC03, 2018.
[Reference Document 7] Kenji Kawano, "Basics and Applications of Optical Coupling System for Optical Device", Gendai Kougaku-sha, first edition, 1991.
[Reference Document 8] H. Takahashi et al., "Wavelength Multiplexer Based on SiO2-Ta2O5 Arrayed-Waveguide Grating", IEEE Journal of Lightwave Technology, vol. 12, no. 6, pp. 989-005, 1994.

REFERENCE SIGNS LIST

101 Optical waveguide chip
102 Light conversion portion
103 First arrayed waveguide
103a Core portion
104 First input-side slab waveguide
104a Core portion
105 First output-side slab waveguide
106 First input waveguide
106a Main first input waveguide
106b Sub first input waveguide
107 First output waveguide
108 Output end
109 Reflection portion
109a Reflection surface
109b Reflection film
110 Right-angle prism
111 Si substrate
112 Lower clad layer
113 Upper clad layer
120a Optical waveguide portion
120b Arrayed waveguide diffraction grating
121 Optical waveguide chip
121a Child optical waveguide chip
121b Child optical waveguide chip
122 Substrate
123 Core
124 Clad layer
124a Lower clad layer
124b Upper clad layer
125 Second arrayed waveguide
126 Second input-side slab waveguide
127 Second output-side slab waveguide
128 Second input waveguide
129 Second output waveguide
131 First groove
132 Second groove
141 Optical waveguide chip
142 Substrate
143 Clad layer
151 Main substrate
152 Support portion
153 Transparent plate
161 Fiber block
162 Optical fiber
163 Connector
171 Spacer member
501 Arrayed waveguide
502 Input-side slab waveguide
503 Output-side slab waveguide
504 Input waveguide
505 Output waveguide.

The invention claimed is:
1. A wavelength checker comprising:
a plurality of optical waveguide chips in a two layer stack, wherein:
a lower layer of the two layer stack comprises a parent optical waveguide chip of the plurality of optical waveguide chips, the parent optical waveguide chip being fixed on a main substrate;
an upper layer of the two layer stack comprises a plurality of child optical waveguide chips;
a clad portion of the parent optical waveguide chip comprises a plurality of first grooves and faces respective clad portions of the plurality of child optical waveguide chips, each comprising a respective plurality of second grooves; and
each of the respective pluralities of second grooves is fitted onto spacer members fitted into each of the plurality of first grooves;
a first child optical waveguide chip of the plurality of child optical waveguide chips connected to an optical fiber and including a first arrayed waveguide diffraction grating; and
a light conversion portion constituted by a conversion material that converts near infrared light to visible light;
wherein:
a reflection portion is fixed to a position on the main substrate such that the reflection portion faces a light emission end surface of a second child optical waveguide chip of the plurality of child optical waveguide chips on a side from which light is output to an external space, the reflection portion including a reflection surface that faces the light emission end surface and is inclined with respect to an upper surface of the main substrate such that a reflection direction of the reflection surface is upward from the main substrate; and
the light conversion portion is arranged on an optical path of reflected light that is emitted from the light emission end surface and reflected off the reflection surface.
2. The wavelength checker according to claim 1, further comprising:
a right-angle prism comprising a light incident surface that faces the light emission end surface and a light emission surface that is orthogonal to the light incident surface, the right-angle prism being arranged on the reflection portion such that a sloped surface of the right-angle prism that is adjacent to the light incident surface and the light emission surface faces the reflection surface,
wherein the light conversion portion is disposed on the light emission surface.
3. The wavelength checker according to claim 1, further comprising:
a transparent plate configured to transmit near infrared light, the transparent plate being supported above the main substrate, and the transparent plate being arranged on the optical path of the reflected light that is emitted from the light emission end surface and reflected off the reflection surface, wherein the light conversion portion is disposed on a plate surface of the transparent plate.
4. The wavelength checker according to claim 1, wherein:
the second child optical waveguide chip includes a group of linear waveguides or a second arrayed waveguide diffraction grating.

5. The wavelength checker according to claim 1, wherein the spacer members are each constituted by an optical fiber.

6. The wavelength checker according to claim 4, wherein: each of the plurality of optical waveguide chips comprises:
a respective substrate constituted by Si, and
a respective clad portion constituted by quartz-based glass.

7. The wavelength checker according to claim 1, wherein the conversion material is a phosphor.

8. The wavelength checker according to claim 1, wherein each of the plurality of optical waveguide chips further comprises a core.

9. The wavelength checker according to claim 8, wherein the core is constituted by quartz-based glass.

10. A wavelength checker comprising:
a plurality of optical waveguide chips in a two layer stack, wherein:
a lower layer of the two layer stack comprises a parent optical waveguide chip of the plurality of optical waveguide chips, the parent optical waveguide chip being fixed on a main substrate;
an upper layer of the two layer stack comprises a plurality of child optical waveguide chips;
a clad portion of the parent optical waveguide chip comprises a plurality of first grooves and faces respective clad portions of the plurality of child optical waveguide chips, each comprising a respective plurality of second grooves; and
each of the respective pluralities of second grooves is fitted onto spacer members fitted into each of the plurality of first grooves;
a first child optical waveguide chip of the plurality of child optical waveguide chips connected to an optical fiber;
a conversion material configured to convert near infrared light to visible light; and
a reflector attached to the main substrate, the reflector including a reflection surface that faces a light emission end surface of the optical waveguide chip, the reflection surface being inclined with respect to an upper surface of the main substrate and being configured to reflect light emitted from the light emission end surface in an upwards direction from the main substrate, wherein the conversion material is arranged on an optical path of reflected light that is reflected off the reflection surface.

11. The wavelength checker according to claim 10, wherein the first child optical waveguide chip includes an arrayed waveguide diffraction grating.

12. The wavelength checker according to claim 10, wherein the conversion material is a phosphor.

* * * * *